S. M. BOLING.
ATTACHMENT FOR SCALE BEAMS.
APPLICATION FILED FEB. 28, 1908.
924,960.
Patented June 15, 1909.
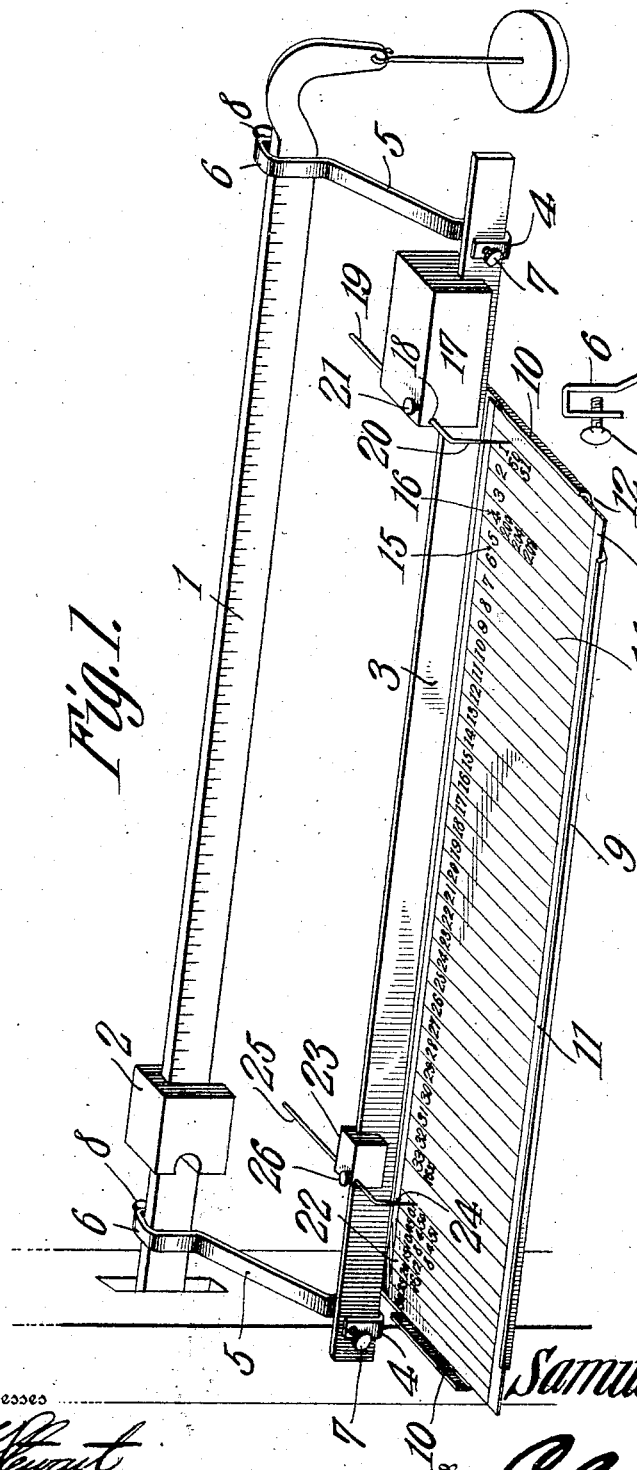
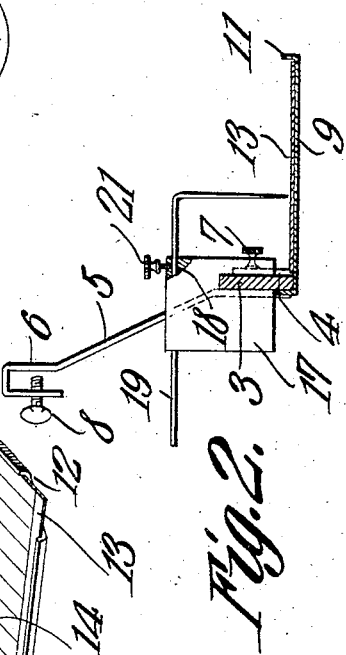
Inventor
Samuel M. Boling.
Witnesses

UNITED STATES PATENT OFFICE.

SAMUEL M. BOLING, OF CHANDLER, OKLAHOMA.

ATTACHMENT FOR SCALE-BEAMS.

No. 924,960.

Specification of Letters Patent.

Patented June 15, 1909.

Application filed February 28, 1908. Serial No. 418,320.

*To all whom it may concern:*

Be it known that I, SAMUEL M. BOLING, a citizen of the United States, residing at Chandler, in the county of Lincoln and State of Oklahoma, have invented a new and useful Attachment for Scale-Beams, of which the following is a specification.

This invention has reference to improvements in an attachment for scale beams, and is designed more particularly for use in connection with large platform scales adapted for heavy weights, although it may be used in connection with smaller scales.

The object of the invention is to provide a means whereby a load of grain or other material may be weighed for gross weight and then the material may be removed and the vehicle or container again placed upon the scale platform and balanced, when the attachment will indicate the weight of the material removed or its price, or any other indication desired.

The invention comprises essentially a bar provided with means for suspending it from a scale beam of ordinary construction, and carried by the bar there is a support for a removable index which may contain indications for weights or prices or both for any number of different kinds of materials.
Upon the bar there is provided two pea weights, each provided with an adjustable indicator or pointer capable of being brought into operative relation to any of the indications on the index.

With such a structure, with the supplemental pea-weights at a predetermined zero position, the gross weight of a loaded vehicle, say a wagon loaded with grain, is readily taken by the weight provided with the ordinary scale beam. The load may then be transported to any desired point of delivery and the emptied vehicle is then again placed upon the scale platform with the ordinary scale weights the same as for the gross weight. Now, one of the supplemental peas is moved from the zero position in a direction in opposition to the movement of the pea used upon the main scale beam when the gross weight was ascertained, until the scale is balanced, and then if this balancing should not occur at a marked index point then the said supplemental pea is moved backward toward the direction from which it was first moved until the indicator shall coincide to the next higher division. The index is so marked that the pointer of the larger supplemental pea will indicate the amount that was removed from the vehicle by the larger denominations. To ascertain overweight within the predetermined units then the smaller pea is employed in like manner to the larger one, the whole range of the smaller pea being within the limits of one of the denominations of the larger pea. Thus, it is possible by the device constituting the subject-matter of the present invention to ascertain, say, the number of bushels of wheat, oats or corn, whether shelled or on the ear, or any other material, and also the number of pounds overweight in addition to the number of bushels indicated. Of course if some other measure than that of bushels be taken as the unit, then the scale will be graduated accordingly. Furthermore, not only the measure of the weight or quantity but indications as to price per unit or fractions of a unit may be placed upon the scale card so that the device will not only give indications as to the weight but also as to the price or value of the load in accordance with the quantity or weight of the load.

The invention will be best understood by a consideration of the following detail description taken in connection with the accompanying drawings forming part of this specification, in which drawings—

Figure 1 is a perspective view of the scale beam attachment and so much of a scale beam as is necessary for an understanding of the invention. Fig. 2 is a cross section, with parts in elevation and broken away, of the attachment separated from the scale beam.

Referring to the drawings, there is shown a scale beam 1 which may be taken as indicative of any type of scale beam to which the invention is adapted. This scale beam is provided with the ordinary sliding pea or poise 2, and with such other parts as are usually present in scale beams but which need not be specifically shown in the drawings.

The attachment comprises a bar 3, which may be a flat bar, as shown, or may be any other suitable shape, and this bar may be as long as necessary for the purposes of the invention, being shown in the drawings as of nearly the same length as the scale beam. The bar is supported near each end in U-clips 4 formed on one end of a bracket 5, the other end of which bracket is formed into another U-clip 6 properly shaped to straddle the scale beam 1 so that the bar 3 is offset from and pendently supported below the scale beam 1. The clips 4 and 6 are provided with suitable thumb-screws 7, 8, so that the brackets 5 may be secured both to the scale beam and to the bar 3, making the whole structure rigid.

Fast to the under side of the bar 3 and projecting laterally therefrom in a direction away from the scale beam 1 is a pan 9 of general rectangular shape somewhat shorter than the distance between the brackets 5. This pan has up-turned ends 10 and an up-turned edge 11 along its longer face. The corners of the pan are cut away at an angle, as shown at 12.

Adapted to be seated in the pan and supported thereby and held from movement by the up-turned ends 10 and the front edge 11, is an index card or member 13 made of any suitable material such as aluminum or other thin metal or celluloid or cardboard or in fact any material suitable for the purpose. This card may be laid off into spaces by lines extending laterally across the same, as indicated at 14, in a direction at right angles to the length of the bar 3, and longitudinal lines may or may not be provided as desired. This index may be provided with a longitudinal series of figures indicated at 15 which may, if desired, represent bushels or other units of weight, and the numbers may be arranged in progressive series from 1 upward, or from any other initial number. Other longitudinal rows of suitable members may be employed, as for instance there may be rows 16 showing the prices of different materials in accordance with the quantity indicated by the row 15 of figures, or any other arrangement of quantities and prices may be employed, and the scale attachment may be arranged for great scope as to the indications of quantities and prices by providing the index card 13 with suitable indications on both sides and also by providing additional index cards as may be desired. In order to facilitate the placing and removal of the index cards the ends of these cards may project beyond the cutaway portion 12, whereby a convenient finger hold is provided for manipulating the cards.

Mounted upon the bar 3 is a pea-weight or sliding poise 17, and this weight, which may be suitably shaped for the purpose, has a laterally-disposed through passage 18 in which is mounted the stem 19 of an index finger 20 bent at right angles to the stem and terminating in a suitably sharp point just above the index card 13. A thumb screw 21 arranged to enter the perforation 18 and carried by the weight 17 serves to clamp the index finger 20 in any position. The stem 19 is of sufficient length to permit the adjustment of the index finger 20 into operative relation to any one of the longitudinal series 15 or 16 of figures upon the index cards.

At the end of the index card remote from the free end of the beam 1, and corresponding end of the bar 3 is another index enumeration indicated at 22 in which there are provided longitudinal rows of figures embracing the component units of the larger units indicated by the rows of figures 15 and 16, and these indicating units 20 are in corresponding relation to the rows showing the larger units. Mounted upon the bar 3 adjacent to the index section 22 is a small pea-weight 23 provided with a pointer 24 having its end in operative relation to the index enumerations 22 and extending laterally from a sliding stem 25 passing through the weight 23 and held in adjusted positions by a thumb screw 26 also carried by the weight 23.

For the purposes of illustration let it be supposed that it is desired to deliver a wagon load of wheat in bulk and to ascertain either the quantity or price, or both, of the wheat delivered. For this purpose the loaded wagon is drawn upon the scale platform and the gross weight ascertained by means of the pea 2, the two supplemental peas 17 and 23 being in the zero position, that is, in the limit of their movement toward the free end of the scale beam 1. It is assumed that when the attachment has been placed upon the scale beam 1 the latter has been suitably balanced with the supplemental peas in the zero position so that the pea 2 will indicate correct weights. Note is taken of the gross weight thus shown by the scales and the wagon is driven to the desired point where the grain is to be delivered. On the return of the wagon it is again placed upon the scale platform and the pea 2, if it has been disturbed from the position showing the gross weight, is again placed in the proper position in accordance with the note taken. Now the supplemental poise 17 representing the larger units of weight or measure or price is moved along the bar 3 away from the free end of the scale beam 1 and toward the pivotal support of said scale beam, until finally the weight of the wagon is balanced. If the pointer 20 in this position is upon one of the unit indications, say one of the lines 14, then the number corresponding to this unit indication will represent the number of units contained in the wagon, if the pointer has traversed the longitudinal unit column, whether this column represents bushels or barrels or other of the larger units of measure or weight. Let it be supposed, however, that when the scale beam is balanced the pointer 20 is at a point between two unit-indicating lines 14, then the larger pea 17 is moved again toward the free end of the scale beam until opposite the adjacent unit line 14. Now, the small pea 23 is moved from its zero position until the scale beam is balanced, when the pointer 24 will indicate the number of component units of a single larger unit which the load contains in excess of the number of larger units. Thus, there is provided a means whereby the number of units and sub-units of measure or weight of the load will be indicated directly upon the attachment without the necessity of taking any note of the tare weight of the vehicle or container. If it be desired to ascertain the price or value of the load, then the index pointer 12 may be moved to the price column of numbers so as to move across the same in like manner to the weight or measure column. If the price column under the control of the pea 17 represents dollars, then the corresponding column under the pea 23 may represent cents as the sub-unit of dollars, or any other valuations may be taken. Again, if one longitudinal column is taken to represent units of weight or measure, say for instance bushels, then the first numerals of the price columns may represent various prices per bushel so that even though placing the index pointer on the price numbers then it is not a difficult matter to trace out the total price at a definite price per unit for the number of units contained in the load, and the sub-units and prices may be ascertained and added to the grosser units and prices.

The attachment is adapted to any ordinary scale beam without the necessity of any modifications whatsoever in such scale beam, and readily adapts any type of scale to the indication of net weights to the net prices without the necessity of ascertaining tare weights.

By offsetting the bar 3 from the scale beam 1 and by arranging the pan or support 9 horizontally, there is an economy of space and no special fastening devices are needed for the index cards 13 and also these index cards are supported in a position in which they may be readily read by a person standing in front of the scale beam in the position usual when the scale is being used.

What is claimed is:—

1. An attachment for scale beams comprising a bar adapted to be attached to a scale beam and provided with an index reading toward the pivot end of the beam and indicating contents of a container the gross weight of which container and contents is obtainable on the main scale beam, the reading of the index from the outer end toward the pivot of the scale beam being in pre-determined units for a portion of the length of the index and then in fractions of said pre-determined units for the remainder of the length of the index, the poise carried by the bar having an active movement in operative relation to the index away from the outer end of the scale beam, and another poise carried by the bar and having an active movement in operative relation to the portion of the index designating fractions of a unit and toward the pivot end of the scale beam, the first named poise having its zero position at the end of the bar remote from the pivot of the scale beam and the second named poise having its zero position at the beginning of that portion of the index designating fractions of the unit and the scale structure being in equilibrium when the two poises are at their zero positions.

2. An attachment for weighing scales comprising a bar, means for supporting said bar from a scale beam in a position parallel thereto, an index member means carried by the bar for supporting the index member, a sliding weight on said bar having a zero position at the end of the bar adjacent to the free end of the scale beam and having an active movement toward the pivoted end of the scale beam, and an indicator or pointer on said sliding weight adjustable in a direction at right angles to the movement of the weight.

3. An attachment for weighing scales comprising a bar, means for supporting said bar from the scale beam of the scales in parallel relation to said scale beam, an index member means on said bar for supporting the index member, and a number of sliding weights on the bar each in operative relation to a corresponding section of the index member and each provided with an adjustable pointer movable into different operative positions with relation to the index member.

4. In a weighing scale, an attachment for the scale beam comprising a bar, means for supporting the same from the scale beam in parallelism thereto, an index member, a support on said bar for said index member, said support projecting horizontally from said bar when in position on the scale beam, and weights on said beam movable negatively with relation to the weights on the scale beam, said negatively movable weights being in active relation to the index member on the support.

5. An attachment for weighing scales comprising a bar, pendent supports for the same shaped to engage the bar and scale beam and hold the said bar offset from the scale beam in parallelism thereto, a pan or support projecting horizontally from the bar when the attachment is in position, an index member adapted to be carried by said support a sliding weight on said bar in operative relation to one portion of the index member and provided with a pointer adjustable in a direction at right angles to the movable sliding weight, and another sliding weight of different capacity than the first-named sliding weight and supported on the bar, said second sliding weight also being provided with an index finger adjustable at right angles to its movement and into operative relation to another portion of the index member.

6. An attachment for weighing scales comprising a bar, means for supporting the same from the scale beam of the scales, weights movable longitudinally of said bar, an index member and a support for an index member projecting horizontally from the bar when the latter is attached to the scale beam.

7. An attachment for weighing scales comprising a weight carrier, means for supporting the same from the scale beam of the scales, a support on said weight carrier projecting horizontally therefrom when the weight carrier is in position on the scale beam, said support having cutaway portions, and an index member adapted to said support and having parts projecting beyond the cutaway portions thereof.

In testimony that I claim the foregoing as my own, I have hereto affixed my signature in the presence of two witnesses.

SAMUEL M. BOLING.

Witnesses:
  JAS. M. THACKER,
  E. W. CADY.